United States Patent
Kamath et al.

(10) Patent No.: US 8,958,433 B2
(45) Date of Patent: Feb. 17, 2015

(54) METHOD AND APPARATUS FOR EXTENDING AN AWAKE STATE OF A STATION

(71) Applicant: QUALCOMM Incorporated, San Diego, CA (US)

(72) Inventors: Purushotham Kamath, San Jose, CA (US); Vijay Dewangan, Santa Clara, CA (US); Praveen Dua, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 200 days.

(21) Appl. No.: 13/756,312

(22) Filed: Jan. 31, 2013

(65) Prior Publication Data

US 2014/0003406 A1    Jan. 2, 2014

Related U.S. Application Data (63) Continuation-in-part of application No. 13/534,837, filed on Jun. 27, 2012.

(51) Int. Cl.
*H04L 12/28* (2006.01)
*H04W 76/04* (2009.01)
*G01S 5/14* (2006.01)
*H04W 52/02* (2009.01)
*H04W 64/00* (2009.01)
*H04W 84/12* (2009.01)

(52) U.S. Cl.
CPC .............. *H04W 76/045* (2013.01); *G01S 5/14* (2013.01); *H04W 52/0216* (2013.01); *H04W 64/00* (2013.01); *H04W 84/12* (2013.01); *Y02B 60/50* (2013.01)
USPC ............................ 370/401; 370/328; 370/338

(58) Field of Classification Search
None
See application file for complete search history.

(56) References Cited

U.S. PATENT DOCUMENTS

| | | | |
|---|---|---|---|
| 7,577,113 B2 * | 8/2009 | Alon et al. ..................... | 370/311 |
| 7,577,449 B2 | 8/2009 | Simpson et al. | |
| 8,027,368 B2 | 9/2011 | Lee et al. | |
| 8,493,590 B2 * | 7/2013 | Fischer et al. ................ | 358/1.15 |
| 8,811,248 B2 * | 8/2014 | Choong ......................... | 370/311 |
| 2005/0018624 A1 * | 1/2005 | Meier et al. ................... | 370/318 |
| 2007/0121560 A1 | 5/2007 | Edge | |
| 2007/0230393 A1 * | 10/2007 | Sinha et al. ................... | 370/328 |
| 2007/0242786 A1 | 10/2007 | Kim et al. | |
| 2009/0186620 A1 * | 7/2009 | Yu et al. ........................ | 455/445 |
| 2009/0323634 A1 | 12/2009 | Kim et al. | |
| 2010/0046492 A1 | 2/2010 | Abraham et al. | |
| 2011/0199952 A1 | 8/2011 | Seok | |
| 2011/0280233 A1 | 11/2011 | Choi et al. | |

FOREIGN PATENT DOCUMENTS

DE    102005041453 A1    3/2007

OTHER PUBLICATIONS

International Search Report and Written Opinion—PCT/US2013/046185—ISA/EPO—Oct. 7, 2013.

* cited by examiner

*Primary Examiner* — Duc C Ho
(74) *Attorney, Agent, or Firm* — Mahamedi Paradice LLP (57) ABSTRACT

A wireless network is disclosed that allows an access point (AP) to keep a station (STA) in an awake state for an extended duration by periodically sending "keep-awake" frames to the STA. The keep-awake frames may be NULL frames having an asserted "more data" bit. For some embodiments, the AP transmits a beacon frame to the STA, wherein the beacon frame includes an asserted traffic indication bit that causes the STA to remain in the awake state for an additional wake-up period. Then, the AP transmits a sequence of keep-awake frames to the STA, wherein each keep-awake frame causes the STA to remain in the awake state for an additional time period.

33 Claims, 10 Drawing Sheets

METHOD AND APPARATUS FOR EXTENDING AN AWAKE STATE OF A STATION

CROSS-REFERENCE TO RELATED APPLICATION

This application is a continuation-in-part of, and claims the benefit under 35 USC 120, of the co-pending and commonly owned U.S. patent application Ser. No. 13/534,837 entitled "METHOD FOR RANGING TO A STATION IN POWER SAVING MODE" filed on Jun. 27, 2012, the entirety of which is incorporated by reference herein.

TECHNICAL FIELD

The present embodiments relate generally to wireless networks, and specifically to determining the location of Wi-Fi enabled wireless devices.

BACKGROUND OF RELATED ART

The recent proliferation of Wi-Fi access points in wireless local area networks (WLANs) has made it possible for navigation systems to use these access points for position determination, especially in areas where there is a large concentration of active Wi-Fi access points (e.g., urban cores, shopping centers, office buildings, and so on). In WLAN positioning systems, the locations of Wi-Fi access points (APs) are used as reference points from which well-known trilateration techniques can determine the location of a mobile wireless device or station (e.g., a Wi-Fi-enabled cell phone, laptop, or tablet computer). For example, the wireless station (STA) can use the received signal strength indicators (RSSI) associated with a number of visible APs as indications of the distances between the mobile device and each of the detected APs, where a stronger RSSI means that the mobile device is closer to the AP and a weaker RSSI means that the mobile device is further from the AP. The STA can also use the round trip time (RTT) of signals transmitted to and from the APs to estimate the distances between the STA and the APs. Once the distances between the STA and at least three APs are calculated, the location of the STA relative to the APs can be determined using trilateration techniques.

WLAN positioning systems are typically controlled by a central server that can instruct APs associated with the WLAN to perform ranging operations with a STA and then report the resulting ranging measurements back to the server. For example, an AP can initiate a ranging operation with the STA by sending a NULL frame to the STA, which in response thereto sends an acknowledgement (ACK) frame back to the AP. The AP can use the difference between the time of departure (TOD) of the NULL frame and the time of arrival (TOA) of the ACK frame to calculate a round trip time (RTT) value of the exchanged NULL and ACK frames. Then, the RTT value can be correlated to a distance.

However, if the AP probes the STA when the STA is in a power save mode, the STA may not receive the NULL frame sent by the AP, in which case the STA will not respond with an ACK frame sent back to the AP. Thus, ranging operations may be difficult to initiate when the STA is in the power save mode. However, it is even more difficult for other APs not associated with the STA to initiate such ranging operations with the STA when the STA is in the power save mode. For example, according to the IEEE 802.11 family of standards, a STA can be "associated" with only one AP at any given time. Thus, the AP with which the STA currently has an established wireless communication channel or link is commonly referred to as the associated AP, and all other APs (which do not have currently have an established wireless communication channel or link with the STA) are commonly referred to as "non-associated" APs. Although these "non-associated" APs can spoof the MAC address of the associated AP and then send spoofed NULL frames to the STA to initiate ranging operations, these non-associated APs typically do not know whether the STA is in the power save mode. Thus, unless the STA coincidentally wakes up from power save mode precisely when these non-associated APs send spoofed NULL frames to the STA, the STA will not receive the spoofed NULL frames and, therefore, will not respond with ACK frames sent back to the spoofing AP. Accordingly, such spoofing techniques frequently fail to successfully initiate ranging operations with a STA that is in power save mode.

Thus, there is a need for WLAN positioning system to allow any of its APs to initiate ranging operations with the STA, regardless of whether the STA is in power save mode and regardless of whether the ranging AP is currently associated with the STA.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A network based positioning (NBP) system is disclosed that solves the above-mentioned problems by allowing any of the system's access points (APs) to initiate ranging operations with a STA within range of the APs, even when the STA is in power save mode. In accordance with the present embodiments, the NBP system includes a server connected to a plurality of APs that together form a wireless local area network (WLAN). Each AP forms a basic service set (BSS) that provides one or more associated STAs with access to one or more networks (e.g., LAN, intranet, the Internet, and so on) connected to the WLAN. To initiate ranging operations with a STA that is associated with one of the WLAN's APs, the server can instruct one or more of the APs not associated with the STA to synchronize themselves with the timing and/or beacon transmission schedules of the associated AP. Once the non-associated APs are synchronized with the associated AP, the non-associated APs can determine when the associated AP is scheduled to transmit beacon frames to the STA and, perhaps more importantly, can also determine when the STA is scheduled to wake up from power save mode to listen for such beacon frames. Thereafter, the non-associated APs can probe the STA during the time periods that the STA is awake from power save mode, thereby ensuring that the STA is able to receive and respond to probes sent from the non-associated APs. Once ranging operations between the non-associated AP(s) and the STA are complete, the non-associated AP(s) can send the resulting ranging measurements to the WLAN server, which in turn can use trilateration techniques to determine the location of the STA. In this manner, the non-associated APs can initiate and successfully complete ranging operations with the STA even when the STA periodically enters and exits the power save mode.

Further, for some embodiments, the server can instruct (e.g., via one or more of its connected APs) the STA to stay awake for longer periods of time upon waking up from power save mode, thereby providing the STA with a longer time period to receive and respond to probes sent to the STA from one or more different APs. For one embodiment, the associated AP can instruct the STA via its transmitted beacon frames that it has additional data frames buffered for the STA (e.g., even if it does not), thereby effectively keeping the STA awake longer than normal. For another embodiment, the associated AP can assert the "more data" bit in any of the data frame sent to the STA, which also causes the STA to stay awake for a longer period of time.

For other embodiments, the associated AP may keep the STA in the awake state for an extended duration (e.g., indefinitely) by periodically sending "keep-awake" frames to the STA, wherein each keep-awake frame may keep the STA in the awake state for an additional time period. For some embodiments, these keep-awake frames may be sent to the STA within one of the AP's beacon intervals (e.g., between transmissions of beacon frames from the AP), thereby providing a mechanism to keep the STA awake for extended durations of time without relying upon and/or waiting for a subsequent beacon transmission. Thus, by sending a plurality (a sequence) of keep-awake frames to the STA, the associated AP may prolong the awake state of the STA for a plurality of additional corresponding time periods (e.g., as long as each keep-awake frame is received by the STA prior to expiration of the additional time period associated with a previous keep-awake frame). For at least one of such embodiments, the keep-awake frame may be a NULL frame having an asserted "more data" bit.

By using keep-awake frames periodically transmitted from the AP to the STA (e.g., rather than relying upon a timer within the STA to keep the STA awake for longer durations), the AP may keep the STA awake for an extended duration without any modifications to the STA. In this manner, the "STA-agnostic" techniques described herein may be used with numerous STAs already in use.

BRIEF DESCRIPTION OF THE DRAWINGS

The present embodiments are illustrated by way of example and are not intended to be limited by the figures of the accompanying drawings, where.

DETAILED DESCRIPTION

The present embodiments are described below in the context of ranging operations performed by and between Wi-Fi enabled devices for simplicity only. It is to be understood that the present embodiments are equally applicable for performing ranging operations using signals of other various wireless standards or protocols. As used herein, the terms WLAN and Wi-Fi can include communications governed by the IEEE 802.11 standards, Bluetooth, HiperLAN (a set of wireless standards, comparable to the IEEE 802.11 standards, used primarily in Europe), and other technologies having relatively short radio propagation range. Further, the term "associated AP" refers to an AP of a WLAN that currently has an established communication channel or link with a STA within range of the WLAN, and the term "non-associated AP" refers to an AP of the WLAN that does not currently have an established communication channel or link with the STA.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scopes all embodiments defined by the appended claims.

Figure 1:
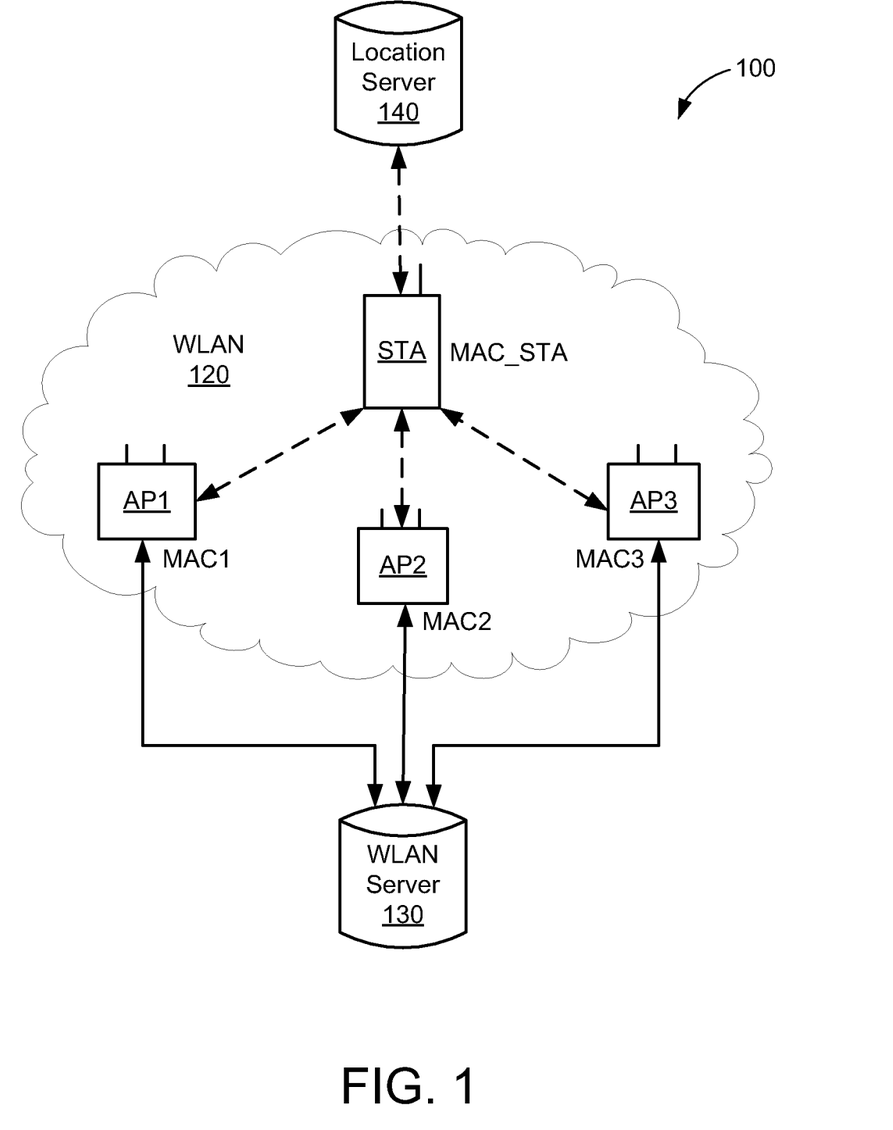
FIG. 1 is a block diagram of a WLAN positioning system within which the present embodiments can be implemented.

FIG. 1 is a block diagram of a wireless network based positioning (NBP) system 100 in accordance with the present embodiments. The NBP system 100 is shown to include a wireless STA, a wireless local area network (WLAN) 120, a WLAN server 130, and an access point location server (APLS) 140. The WLAN 120 is formed by a plurality of Wi-Fi access points (APs) that may operate according to the IEEE 802.11 family of standards (or according to other suitable wireless protocols). Although only three access points AP1-AP3 are shown in FIG. 1 for simplicity, it is to be understood that WLAN 120 can be formed by any number of access points. Each of access points AP1-AP3 is assigned a unique MAC address (i.e., MAC1-MAC3, respectively) that is programmed therein by, for example, the manufacturer of the access point. Similarly, the STA is also assigned a unique MAC address (MAC_STA). Each MAC address, which may be commonly referred to as the "burned-in address," the organizationally unique identifier (OUI), or the BSSID, in one embodiment includes six bytes (and thus 12 nibbles) of data. The first 3 bytes of the MAC address may identify which organization manufactured the device, and may be assigned to such organizations by the Institute of Electrical and Electronic Engineers (IEEE). The second 3 bytes of the MAC address, which may be referred to as the network interface controller (NIC) specific bytes, may be used to uniquely identify the individual device.

The WLAN server 130, which is coupled to AP1-AP3 over wired and/or wireless connections to control the operation of the APs, can instruct any of its associated APs to initiate ranging operations with the STA (e.g., to determine the location of the STA), regardless of whether a particular AP is currently associated with the STA and/or regardless of whether the STA avails itself of power save mode. More specifically, as described in more detail below, the WLAN server 130 can synchronize the transmission of probes from non-associated APs with the transmission of beacon frames from the associated AP so that the probes arrive at the STA during the time period that the STA wakes-up from power save mode to listen for the beacon frames broadcast by the associated AP. In addition, the WLAN server 130 can also coordinate the operation of one or more of its APs to keep the STA awake for longer time periods, thereby increasing the time period during which the STA is responsive to probes sent from one or more non-associated APs.

The APLS 140, which may be accessible by the STA and/or the WLAN server 130, includes a database that stores the MAC addresses and location coordinates of a plurality of deployed access points (e.g., not just access points AP1-AP3 of FIG. 1). The database (not shown for simplicity) associated with the APLS 140 may be provided by companies such as Google, Skyhook, Devicescape, and/or WiGLE. The APLS 140 may also store other information associated with the access points including, for example, the accuracy of the location coordinates of each access point, the last location update for each access point, the last time each access point was visible, the protocol version of each access point, and so on. For some embodiments, selected portions of the APLS 140 can be retrieved and stored within the STA. For other embodiments, the APLS 140 may be omitted.

The STA can be any suitable Wi-Fi enabled wireless device including, for example, a cell phone, PDA, tablet computer, laptop computer, or the like. For the embodiments described herein, the STA may include radio frequency (RF) ranging circuitry (e.g., formed using well-known software modules, hardware components, and/or a suitable combination thereof) that can be used to estimate the distance between itself and one or more visible access points (AP) using suitable ranging techniques. For example, the STA can use received signal strength indicator (RSSI) and/or round trip time (RTT) techniques to estimate the distance between itself and the access points AP1-AP3, for example, by correlating each RSSI or RTT value with a distance. In addition, the STA may include a local memory that stores a cache of Wi-Fi access point location data, and includes a processor that may execute WLAN positioning software, ranging software, APLS data retrieval software, and/or power save mode software, as described in more detail below.

Figure 2:
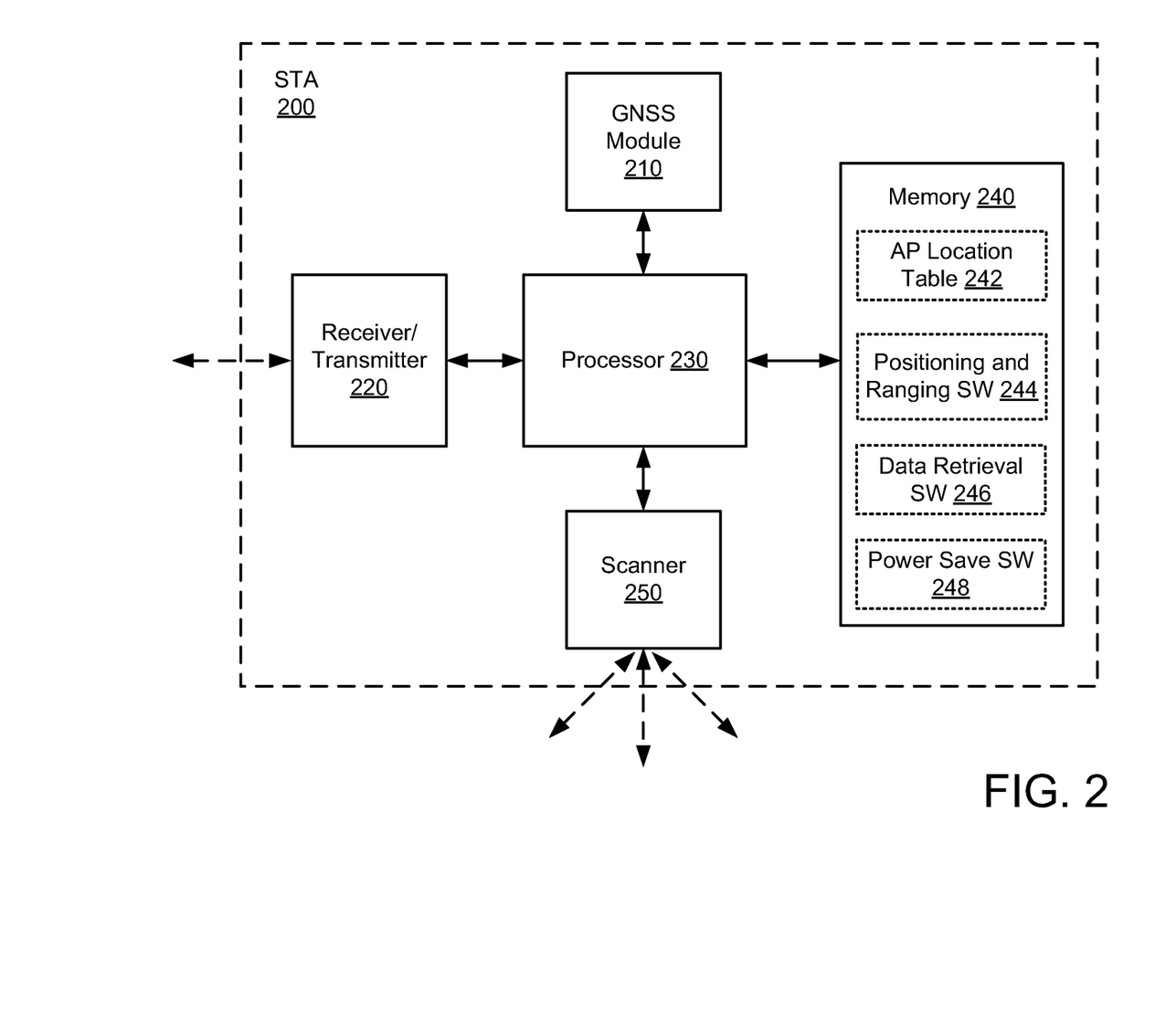
FIG. 2 is a block diagram of a wireless station (STA) in accordance with some embodiments.

FIG. 2 shows a STA 200 that is one embodiment of the STA of FIG. 1. The STA 200 includes a global navigation satellite system (GNSS) module 210, a transmitter/receiver circuit 220, a processor 230, a memory 240, and a scanner 250. The transmitter/receiver circuit 220 can be used to transmit signals to and receive signals from access points AP1-AP3 and/or APLS 140 (see also FIG. 1). Scanner 250, which is well-known, can be used to scan the surrounding environment to detect and identify nearby access points (e.g., access points within range of STA 200). For some embodiments, the scanner 250 can search for nearby access points by periodically transmitting MAC address request frames. An AP within range of STA 200 receives one or more of the requests and responds by transmitting its MAC address to the STA 200. If the STA 200 has line-of-sight with a suitable number (e.g., 3 or more) of navigation satellites, the GNSS module 210 can determine the current location of the STA 200 using triangulation techniques, and can then provide the location information to processor 230 for storage in memory 240.

Memory 240 may include an AP location table 242 that can be used as a local cache to store the MAC addresses of a plurality of APs, the location coordinates of such APs, and other suitable location or configuration information of the APs. For some embodiments, each entry of the AP location table 242 includes an access point field to store the name of the associated AP, a BSSID field to store the MAC address of the AP, a coordinate field to store the location coordinates of the AP, and an uncertainty field to store a location uncertainty value for the AP.

Figure 8:
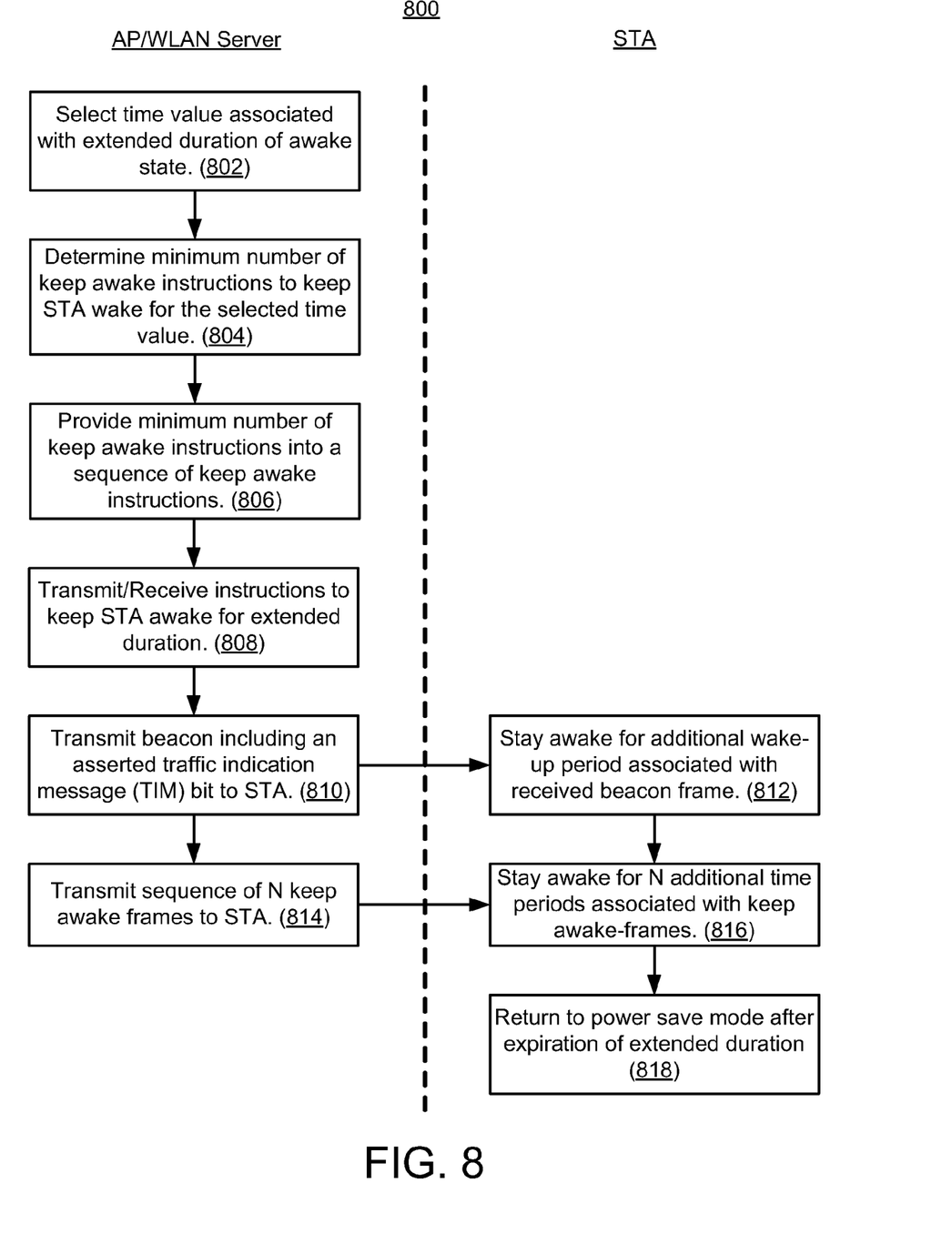
FIG. 8 is an illustrative flow chart depicting one embodiment of the operation illustrated in FIG. 7.

Memory 240 may also include a non-transitory computer-readable medium (e.g., one or more nonvolatile memory elements, such as EPROM, EEPROM, Flash memory, a hard drive, and so on) that can store the following software modules:

- a positioning and ranging software module 244 to determine the location of the STA based on locations of APs using, for example, trilateration techniques and/or to enable ranging operations with one or more APs of a corresponding WLAN (e.g., as described for operation 654 of FIG. 6B);
- a data retrieval software module 246 to query the APLS 140 for access point information; and
- a power save software module 248 to selectively enter power save mode to reduce power consumption and to selectively wake-up from power save mode to listen for and receive beacon frames, probes, and/or other signals transmitted to the STA from one or more APs (e.g., as described for operations 664 and 674 of FIGS. 6C and 6D, respectively), and/or for remaining in an awake state for an extended duration (e.g., as described for operations 812, 816, and/or 818 of FIG. 8).

Each software module includes instructions that, when executed by processor 230, can cause the STA 200 to perform the corresponding functions. Thus, the non-transitory computer-readable medium of memory 240 can include instructions for performing all or a portion of the station-side operations of methods 650, 660, and 670 of FIGS. 6B, 6C, and 6D, respectively.

Processor 230, which is coupled to transmitter/receiver circuit 220, GNSS module 210, memory 240, and scanner 250, can be any suitable processor capable of executing scripts or instructions of one or more software programs stored in the STA 200 (e.g., within memory 240). For example, processor 230 can execute WLAN positioning and ranging software module 244, data retrieval software module 246, and/or power save software module 248. The positioning and ranging software module 244 can be executed by processor 230 to determine the location of the STA 200 using nearby APs as reference points. For example, to determine the position of the STA 200, the precise locations of three selected APs (e.g., access points AP1-AP3) are first determined, either by accessing their location coordinates from AP location table 242, by retrieving their location coordinates from the APLS 140, or by parsing AP location information embedded within signals transmitted by the APs. Then, positioning and ranging software module 244 as executed by processor 230 can estimate the distance between the STA 200 and each of the selected APs using suitable RF ranging techniques (e.g., RSSI and/or RTT techniques), and thereafter can use the location coordinates of the selected APs and the estimated distances between them and the STA 200 to calculate the position of the STA 200 using, for example, trilateration techniques. The positioning and ranging software module 244 can also be executed by processor 230 to initiate, respond to, and/or enable the STA 200 to perform or otherwise participate in ranging operations with the APs.

The data retrieval software module 246 can be executed by processor 230 to retrieve the location coordinates of one or more APs of interest from the APLS 140, and to provide such location coordinates to AP location table 242 for storage and/or to positioning and ranging software module 244 for determining the location of the STA 200.

The power save software module 248 can be executed by processor 230 to cause the STA 200 to enter power save mode, and to wake-up from power save mode (e.g., to listen for and receive beacon frames, probes, NULL frames, management frames, and/or other signals transmitted to the STA from one or more the APs).

Figure 3:
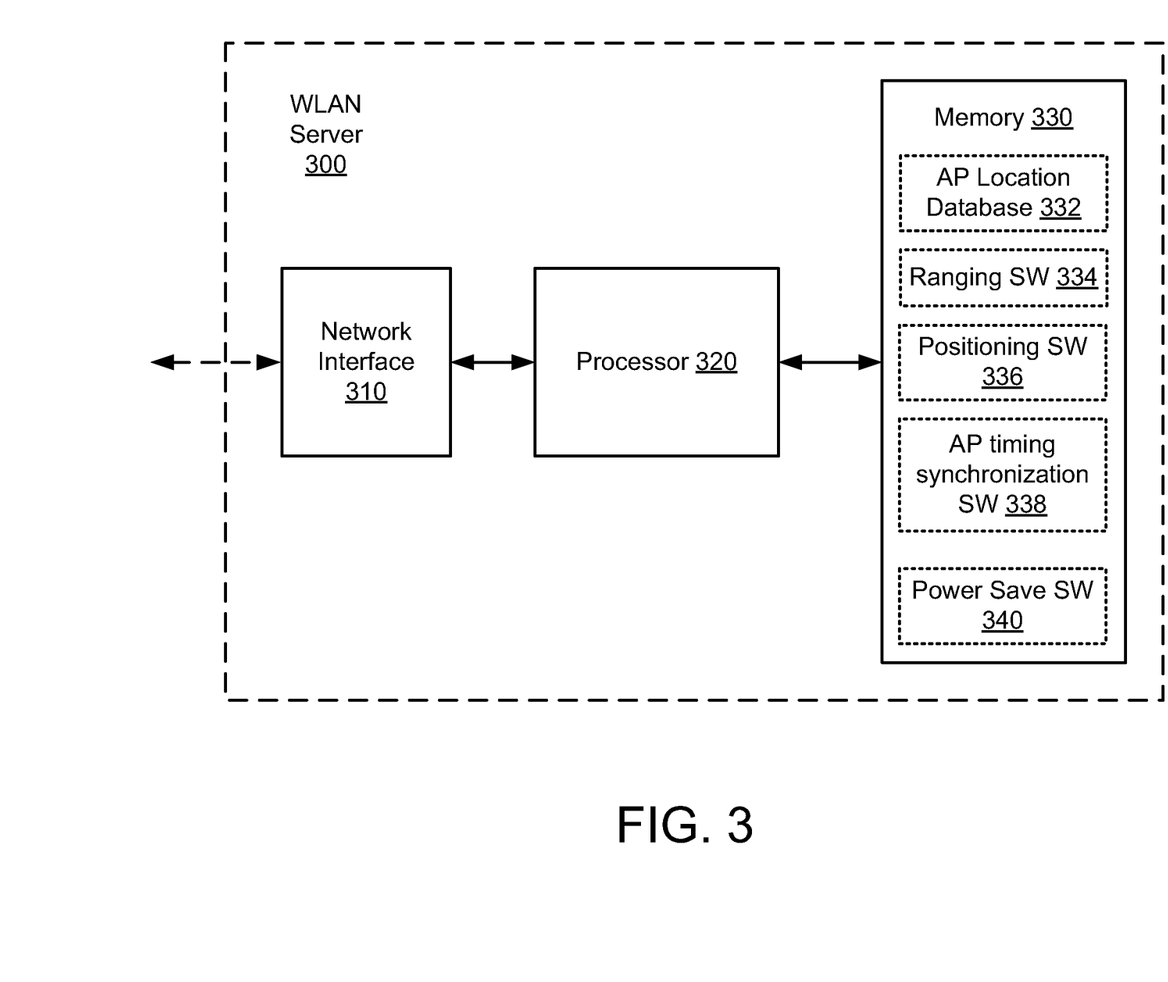
FIG. 3 is a block diagram of a WLAN server in accordance with some embodiments.

FIG. 3 shows a WLAN server 300 that is one embodiment of WLAN server 130 of FIG. 1. WLAN server 300 includes a network interface 310, a processor 320, and a memory 330. The network interface 310 can be used to communicate with APs associated with WLAN 120 (e.g., access points AP1-AP3) either directly or via one or more intervening networks and to transmit signals, and can be used to communicate with an associated distributed service (DS) network including, for example, a private LAN, a virtual LAN, an intranet, the Internet, and the like. Processor 320, which is coupled to network interface 310 and memory 330, can be any suitable processor capable of executing scripts or instructions of one or more software programs stored in WLAN server 300 (e.g., within memory 330).

Figure 6A:
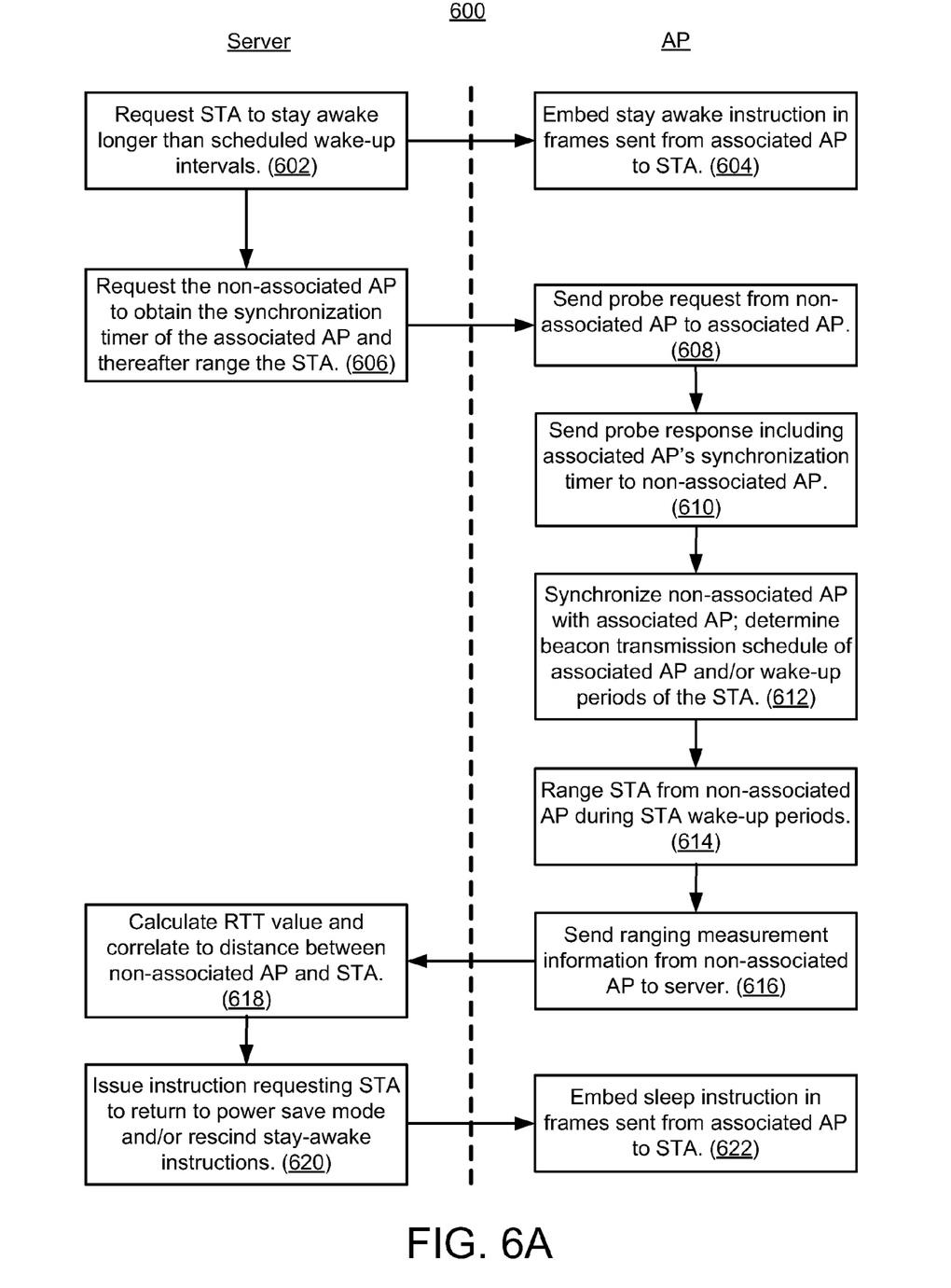
FIGS. 6A-6D are illustrative flow charts depicting ranging operations in accordance with the present embodiments.

Memory 330 includes an AP location database 332 that stores the MAC addresses (e.g., BSSIDs) of a plurality of APs, the location coordinates of such APs, and other suitable location or configuration information of the APs. Memory 330 also includes a non-transitory computer-readable medium (e.g., one or more nonvolatile memory elements, such as EPROM, EEPROM, Flash memory, a hard drive, and so on) that can store the following software modules:

- a ranging software module 334 to instruct one or more AP(s) associated with WLAN 120 to perform ranging operations with the STA (e.g., as described for operation 606 of FIG. 6A);
- a positioning software module 336 to determine the location of the STA based on known locations of the APs and calculated RTT values and/or distances between the STA and the APs using, for example, trilateration techniques (e.g., as described for operation 618 of FIG. 6A);
- an AP timing synchronization software module 338 to facilitate the timing synchronization of multiple APs associated with the WLAN 120 (e.g., as described for operation 606 of FIG. 6A);
- a power save software module 340 to instruct one or more APs to request the STA to selectively enter power save mode, to selectively exit power save mode, and/or to stay awake for longer periods of time upon waking up from power save mode (e.g., as described for operations 602 and 620 of FIG. 6A and/or for operations 802, 804, and/or 806 of FIG. 8).

Each software module includes instructions that, when executed by processor 320, cause the WLAN server 300 to perform the corresponding functions. The non-transitory computer-readable medium of memory 330 thus includes instructions for performing all or a portion of the server-side operations of method 600 of FIG. 6A.

Processor 320, which is coupled to network interface 310 and memory 330, can be any suitable processor capable of executing scripts or instructions of one or more software programs stored in the WLAN server 300 (e.g., within memory 330). For example, processor 320 can execute ranging software module 334, positioning software module 336, AP timing synchronization software module 338, and/or power save software module 340.

Figure 4:
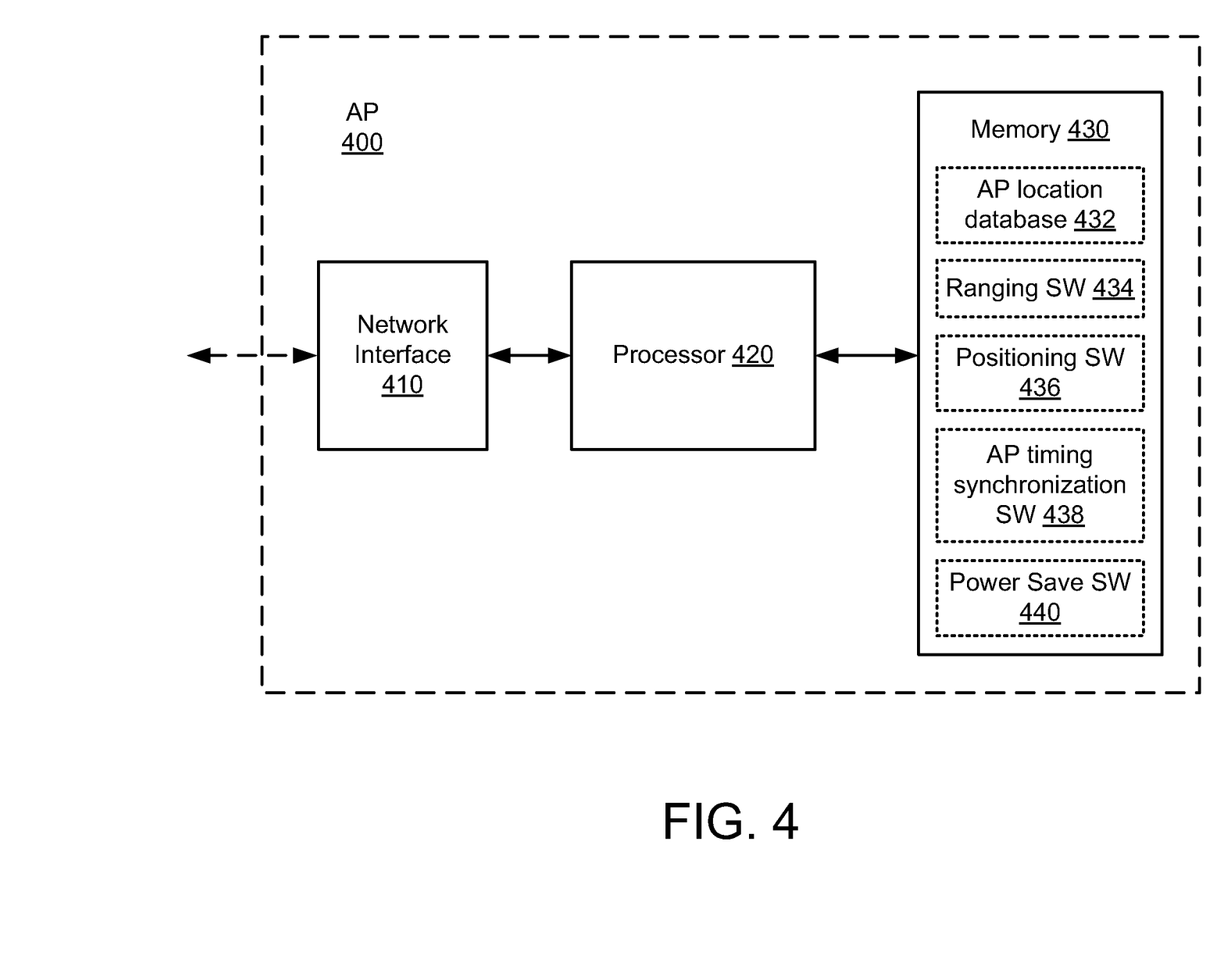
FIG. 4 is a block diagram of an access point (AP) in accordance with some embodiments.

FIG. 4 shows an AP 400 that is one embodiment of the access points AP1-AP3 of FIG. 1. AP 400 includes a network interface 410, a processor 420, and a memory 430. The network interface 410 can be used to communicate with WLAN server 300 of FIG. 3 either directly or via one or more intervening networks and to transmit signals. Processor 420, which is coupled to network interface 410 and memory 430, can be any suitable processor capable of executing scripts or instructions of one or more software programs stored in AP 400 (e.g., within memory 430).

Figure 6B:
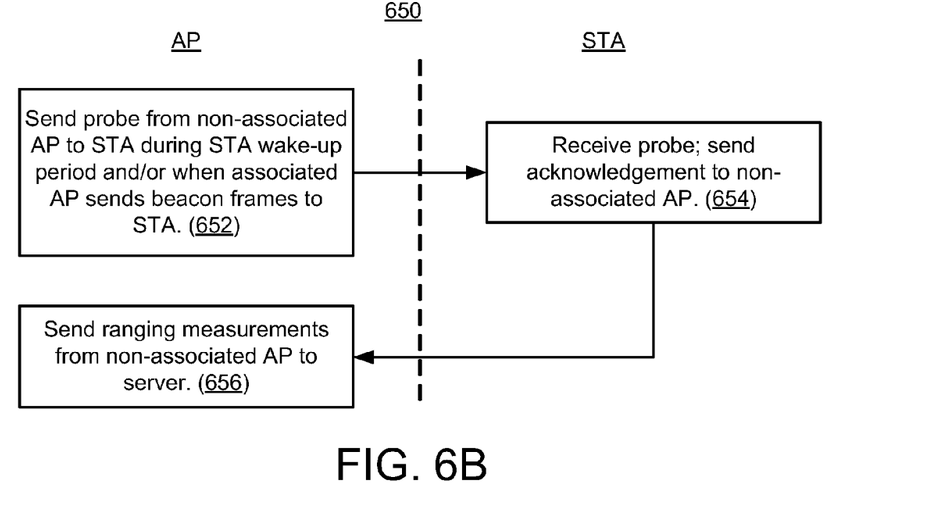
Figure 6C:
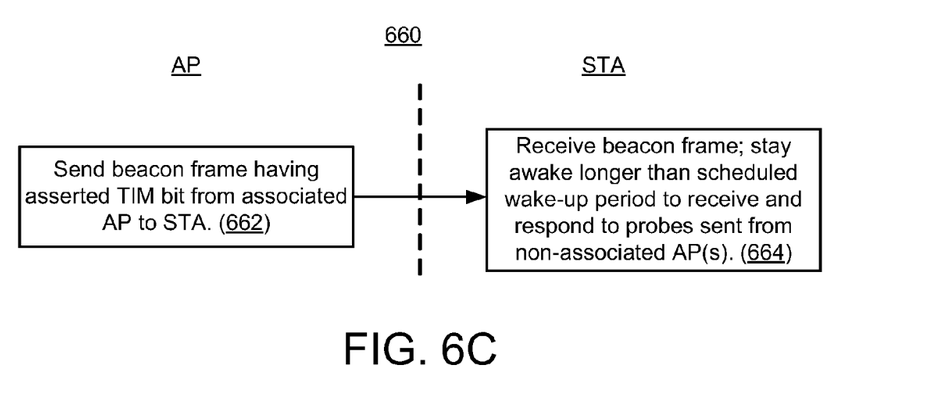
Figure 6D:
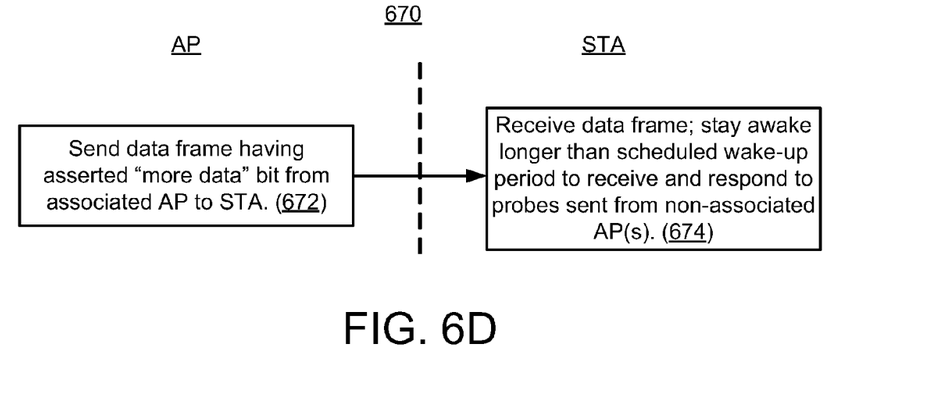

Memory 430 includes an AP location database 432 that stores the MAC addresses (e.g., BSSIDs) of a plurality of APs, the location coordinates of such APs, and other suitable location or configuration information of the APs. Memory 430 also includes a non-transitory computer-readable medium (e.g., one or more nonvolatile memory elements, such as EPROM, EEPROM, Flash memory, a hard drive, and so on) that can store the following software modules:

- a ranging software module 434 to initiate and perform ranging operations with one or more STAs (e.g., as described for operations 614 and 616 of FIG. 6A, and/or for operations 652 and 656 of FIG. 6B);
- a positioning software module 436 to determine the location of the STA based on known locations of the APs and calculated RTT values and/or distances between the STA and the APs using, for example, trilateration techniques;
- an AP timing synchronization software module 438 to facilitate the timing synchronization of multiple APs associated with the WLAN 120 (e.g., as described for operations 608, 610, and 612 of FIG. 6A);
- a power save software module 440 to instruct one or more STAs to selectively enter power save mode, to selectively exit power save mode, and/or to stay awake for longer periods of time upon waking up from power save mode (e.g., as described for operations 604 and 622 of FIG. 6A, for operation 662 of FIG. 6C, for operation 672 of FIG. 6D, and/or for operations 802, 804, 806, 808, 810, and/or 814 of FIG. 8).

Each software module includes instructions that, when executed by processor 420, cause the WLAN server 400 to perform the corresponding functions. The non-transitory computer-readable medium of memory 430 thus includes instructions for performing all or a portion of the AP-side operations of methods 600, 650, 660, and 670 of FIGS. 6A, 6B, 6C, and 6D, respectively.

Processor 420, which is coupled to network interface 410 and memory 430, can be any suitable processor capable of executing scripts or instructions of one or more software programs stored in the WLAN server 400 (e.g., within memory 430). For example, processor 420 can execute ranging software module 434, positioning software module 436, AP timing synchronization software module 438, and/or power save software module 440.

As discussed above with respect to FIG. 1, the NBP system 100 allows any of the APs associated with WLAN 120 to initiate ranging operations with the STA, even if the STA avails itself of power save mode and/or if the ranging AP does not have an established wireless connection with the STA (e.g., even if the ranging AP is not currently associated with the STA). In accordance with the present embodiments, the WLAN server 130 can synchronize the timing of the non-associated APs of WLAN 120 with the timing of the associated AP of the WLAN 120 to ensure that probes intended to initiate ranging operations with the STA are sent from the non-associated APs to the STA precisely during the time periods that the STA is awake from power save mode (e.g., during STA wake-up periods intended to allow the STA to listen for beacon frames transmitted by the associated AP). In this manner, probes sent from the non-associated AP(s) will arrive at the STA during the STA's wake-up periods, thereby ensuring that the STA is able to (1) receive such probes and (2) respond with corresponding ACK frames sent back to the ranging AP(s). Thereafter, each of the ranging APs can use the TOD of the probe and the TOA of the ACK frame to calculate an RTT value between the ranging AP and the STA. For other embodiments, the ranging AP(s) can send the TOD/TOA information to the WLAN server 130, which in turn can calculate the RTT values, correlate the RTT values to distances, and thereafter determine the location of the STA using, for example, trilateration techniques.

Further, for some embodiments, the NBP system 100 can instruct the STA to stay awake for longer periods of time when waking-up from the power save mode, thereby increasing the time period that the STA is able to receive and respond to the NULL frames sent by the non-associated AP(s). For one embodiment, the associated AP can cause the STA to stay awake longer by informing the STA that the associated AP has additional data waiting to be sent to the STA (e.g., even if there really isn't any additional data to be sent). For another embodiment, the associated AP can send "keep-awake" frames to the STA that cause the STA to remain awake for additional periods of time. These and other mechanisms for keeping the STA awake for longer than the STA's normal or scheduled wake-up periods are described in more detail below.

Figure 5A:
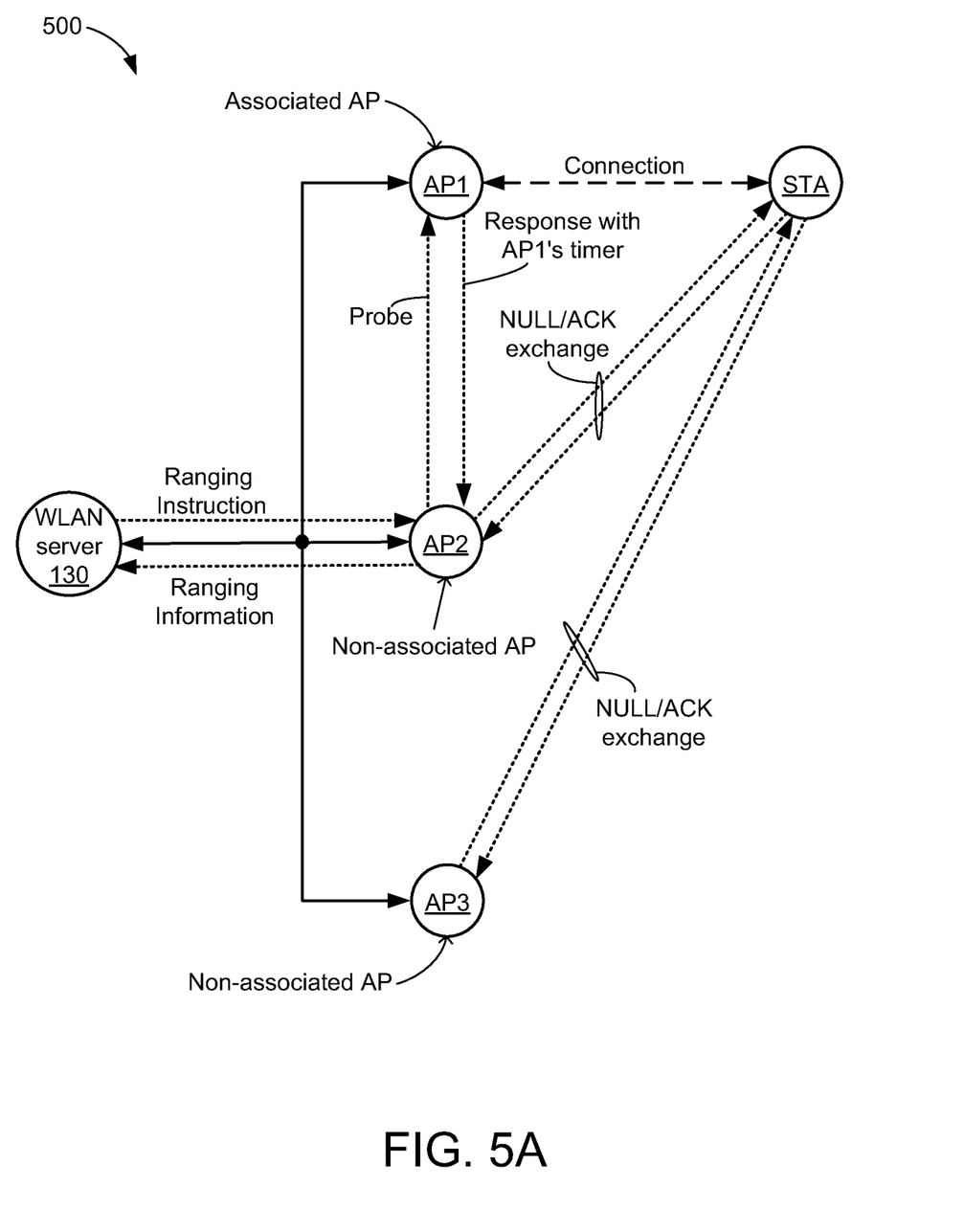
FIG. 5A is a sequence diagram depicting an exemplary ranging operation in accordance with some embodiments.
Figure 5B:
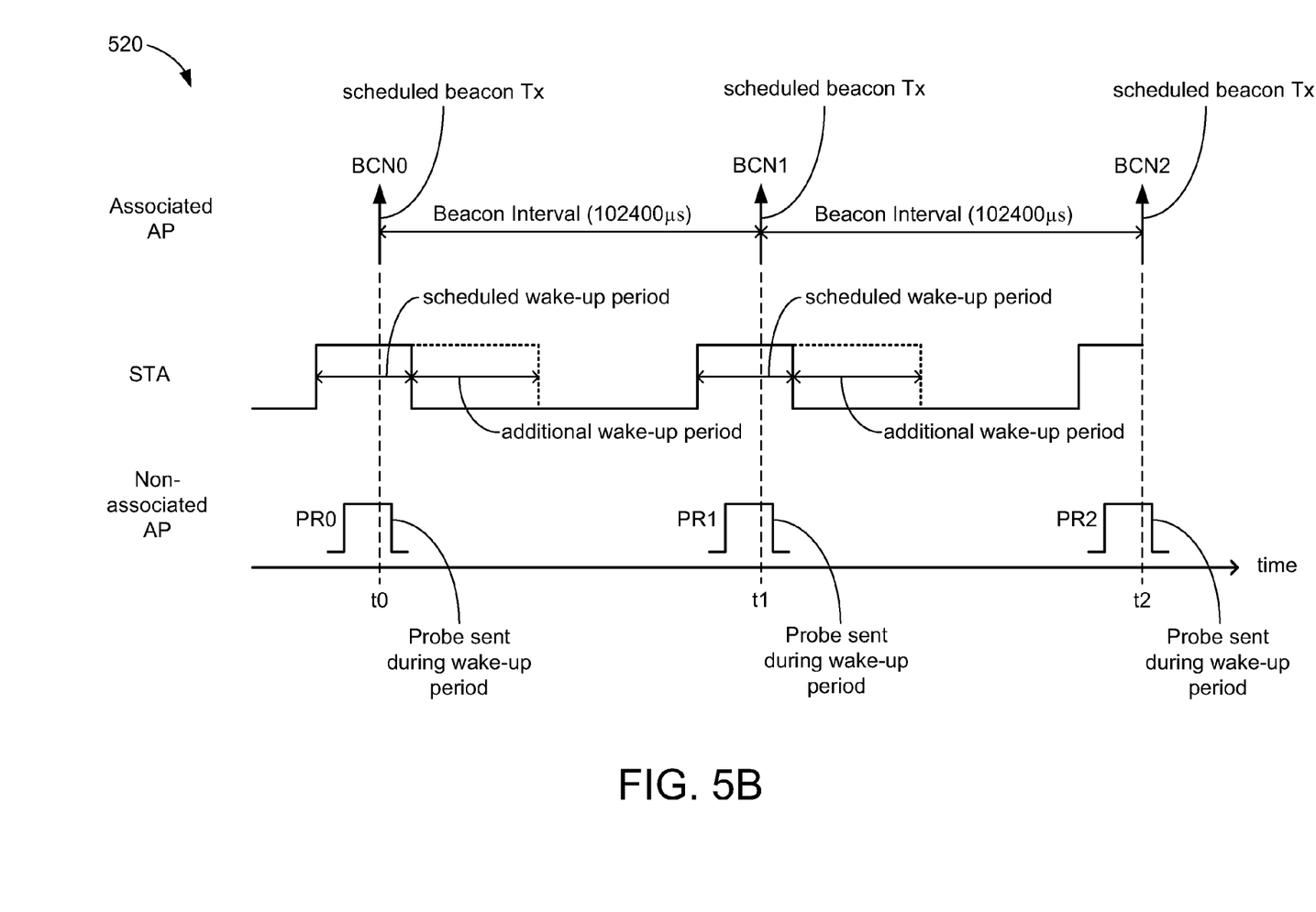
FIG. 5B is a timing diagram for the exemplary ranging operation depicted in FIG. 5A.

An exemplary ranging operation performed by the NBP system 100 of FIG. 1 is depicted in the sequence diagram 500 of FIG. 5A and the timing diagram 520 of FIG. 5B. As shown in FIG. 5A, WLAN server 130 is connected to and controls the operation of access points AP1-AP3, which together form the WLAN 120 and, along with WLAN server 130, implement the NBP system 100 of FIG. 1. For the sequence diagram 500 of FIG. 5A, the STA is currently associated with AP1 (e.g., the STA has an established wireless connection with AP1), and is not currently associated with AP2 or AP3. Thus, AP1 is denoted as an "associated" access point, while AP2 and AP3 are denoted as "non-associated" access points.

In accordance with the present embodiments, the WLAN server 130 can synchronize the timer and/or clocks of the non-associated access points AP2 and AP3 with the timer and/or clocks of the associated access point AP1, thereby allowing the non-associated APs to synchronize their initiation of STA ranging operations (e.g., their transmission of probes to the STA) with the beacon transmission schedule of the associated AP. In this manner, the present embodiments ensure that probe frames sent from non-associated access points AP2 and/or AP3 arrive at the STA during its wake-up periods from power save mode, thereby ensuring that the STA is awake to participate in ranging operations initiated from one or more of the non-associated APs.

It is noted that because AP1 is associated with the STA, the STA knows when AP1 is scheduled to broadcast beacon frames to the STA, and AP1 knows when the STA is to enter the power save mode. More specifically, in accordance with the IEEE 802.11 standards, once AP1 and the STA establish a wireless connection such that AP1 is associated with the STA, AP1 periodically broadcasts beacon frames to the STA, and the STA periodically wakes up from power save mode to listen for such beacon frames. The beacon frames broadcast from AP1 include AP1's MAC address, AP1's timing synchronization function (TSF) timer, "more data" bits indicating whether AP1 has more data to send to the STA, and other information. For the exemplary embodiments described herein, the TSF timer is a modulus $2^{64}$ counter that increments in micro-seconds, and thus has a maximum count value of $2^{64}$=102,400 micro-seconds (although other suitable timers, clocks, and/or counters may be used). Thus, for such embodiments, the TSF timer of associated AP1 provides a beacon interval of 102,400 micro-seconds.

The STA uses AP1's TSF timer to synchronize its own local TSF timer, thereby allowing AP1 and the STA to establish a series of target beacon transmission times that are spaced apart by the beacon interval. Thus, once the beacon transmission schedule is synchronized between the STA and its associated access point AP1, AP1 broadcasts beacon frames to the STA at the scheduled beacon transmission times using its TSF timer, and the STA wakes up to listen for such beacon frames at scheduled wake-up times. Once awake, the STA typically remains awake for a predetermined period of time (which is referred to herein as the "STA wake-up period"). For some embodiments, the STA wakes up a few milliseconds prior to AP1's scheduled broadcast of each beacon frame, and stays awake a few hundred microseconds after the end of AP1's scheduled broadcast of each beacon frame. Thus, the STA's wake-up period typically begins before and ends after the scheduled beacon transmission time period.

Upon receipt of each beacon frame, the STA sends a beacon response frame to AP1. Further, in accordance with the IEEE 802.11 standards, the STA informs its associated access point AP1 when it is going to enter the power save mode, for example, by STA setting the power management (PM) bit=1 in the beacon response frames sent to AP1. If the STA is not going to enter the power save mode during the beacon interval period, then the STA can set the PM bit=0 to indicate that it is not going to enter the power save mode.

For example, FIG. 5B is a timing diagram depicting the temporal relationship between the beacon transmission times, the beacon intervals, the STA wake-up periods, and the initiation of STA ranging operations from non-associated APs in accordance with the present embodiments. More specifically, FIG. 5B shows the associated AP transmitting beacon frames BCN0, BCN1, and BCN2 at scheduled transmission times t0, t1, and t2, respectively. The beacon transmission times are separated by a beacon interval of $2^{64}$=102,400 micro-seconds provided by the TSF timer of the associated AP. The STA has scheduled wake-up periods that are substantially centered around the beacon transmission times, where each of the STA's scheduled wake-up periods begins between approximately 2500-3500 micro-seconds before the corresponding scheduled beacon transmission time and ends between approximately 400-500 micro-seconds after the corresponding scheduled beacon transmission time. As mentioned earlier, the STA can be kept awake for longer periods of time, for example, as depicted by the "additional wake-up periods" in FIG. 5B, in response to receiving "stay awake" instructions from its associated AP. Thereafter, the non-associated AP(s) can be instructed to transmit probes PR0-PR2 to the STA at similar times as corresponding beacons BCN0-BCN2 are transmitted from the associated AP to the STA to ensure that the probes are sent to and received by the STA during corresponding STA wake-up periods.

Referring again to FIG. 5A, once the communication link between AP1 and the STA has been established and the STA's TSF timer has been synchronized with AP1's TSF timer, the WLAN server 130 issues a ranging instruction that instructs the non-associated access point AP2 to obtain AP1's beacon transmission schedule and to thereafter initiate ranging operations with the STA. In response thereto, AP2 sends a probe request to AP1, which in turn sends to AP2 a response frame that includes AP1's TSF timer. AP2 can determine AP1's target beacon transmission times from AP1's TSF timer, and can synchronize its own TSF timer with AP1's TSF timer.

Thereafter, the non-associated AP2 can initiate ranging operations with the STA according to AP1's scheduled beacon transmission times so that probes sent from the non-associated AP2 arrive at the STA during the STA wake-up times, for example, as depicted in FIG. 5B. In this manner, the present embodiments ensure that the STA can receive probes sent from non-associated APs and respond with corresponding acknowledgement (ACK) frames. For some embodiments, the non-associated APs can spoof the MAC address of the associated AP1 when sending probes to the STA.

For exemplary embodiments described herein, the probes sent by the non-associated APs (e.g., AP2 and/or AP3) can be either NULL frames or QoS NULL frames. For other embodiments, any frames that elicit a response from the STA can be used as probe frames (e.g., RTS/CTS frame exchanges).

Thereafter, AP2 can use the TOD of the NULL frame and the TOA of the ACK frame to determine an RTT value between AP2 and STA, which in turn can be correlated to a distance between AP2 and STA. For some embodiments, AP2 can send the RTT measurements back to WLAN server 130, which in response thereto can calculate the RTT value and thereafter correlate the RTT value to a distance. For other embodiments, AP2 can send the ranging measurements (e.g., TOD/TOA information the NULL/ACK frame exchange) to the WLAN server 130, which in can calculate the RTT value and then correlate the RTT value to a distance.

This process can be repeated with the non-associated AP3 to initiate ranging operations between AP3 and the STA, which in turn can be used to calculate the distance between AP3 and the STA. Subsequently, when the WLAN server 130 has obtained or calculated the distances between three access points (e.g., AP1-AP3) and the STA, the WLAN server 130 can determine the location of the STA using, for example, trilateration techniques. After the ranging operations are complete, the associated AP1 can instruct the STA to re-enter the power save mode (e.g., to go to sleep).

As mentioned above, for some embodiments, the WLAN server 130 can cause the STA to stay awake for longer periods of times than the STA's predetermined wake-up period, thereby providing a larger time window for the STA to receive and respond to probes transmitted by the non-associated access points AP2 and/or AP3, for example, as depicted in FIG. 5B. In this manner, the WLAN server 130 not only coordinates the ranging operations of multiple access points with the STA but also keeps the STA awake for longer periods of time to ensure that the STA is able to receive and respond to multiple probes sent from a number of different APs. For one embodiment, the WLAN server 130 can instruct the associated AP1 to set the traffic indication message (TIM) bits provided within its beacon frames to a state that indicates AP1 has additional data frames to be delivered to the STA (e.g., even if AP1 does not have any additional data frames), which in turn causes the STA to remain its in awake state longer periods of time. For another embodiment, the WLAN server 130 can instruct the associated AP1 to set the "more data" bit provided within one or more MAC frames sent to the STA, thereby turning such frames into "keep-awake" instructions to the STA to keep the STA awake for longer periods of time. Note that the length of time that AP1 can keep the STA awake beyond the scheduled wake-up period varies depending upon the make-and-model of the STA.

Further, note that the associated AP1 can set the delay traffic indication message (DTIM) bit in its beacon frames to a value of 1 so that the STA wakes up on every beacon transmission period. Also, note that if the non-associated AP2 is on a different channel than the STA, then AP2 can change channels to perform the ranging operation and then return to its home channel.

FIG. 6A is a flowchart illustrating a method 600 for performing ranging operations in accordance with the present embodiments. As described above, the present embodiments allow one or more APs of a WLAN system to initiate ranging operations with a STA, regardless of whether a particular AP is associated with the STA and regardless of whether the STA avails itself of power save mode. Referring also to FIGS. 1, 5A, and 5B, in the method 600, the WLAN server 130 issues a ranging instruction that may request the STA to stay awake longer than its predetermined or scheduled wake-up periods (602). The ranging instruction also requests the non-associated AP to obtain the synchronization timer of the associated AP and thereafter initiate ranging operations with the STA (606). In response to the request to stay awake, the associated AP can embed a stay-awake instruction in frames sent to the STA device (604). In response to the request to obtain the synchronization timer of the associated AP, the non-associated AP sends a probe request to the associated AP (608). The associated AP responds by sending, to the non-associated AP, a probe response that includes its synchronization timer (610). Once the associated AP's synchronization timer is obtained, the non-associated AP can synchronize itself with the associated AP using the obtained synchronization timer, and can then determine the associated AP's beacon transmission schedule and/or determine when the STA wake-up periods occur (612). After the non-associated AP is synchronized with the associated AP, the non-associated AP can range the STA during the STA's wake-up periods (614), and then send the ranging measurements (e.g., TOD/TOA information) to the WLAN server 130 (616).

Next, the WLAN server 130 can use the ranging measurements provided by the non-associated AP to calculate an RTT value, and then correlate the RTT value to a distance between the non-associated AP and the STA (618). After the ranging operation is complete, the WLAN server 130 may issue an instruction requesting the STA to return to power save mode (620). In response thereto, the associated AP may embed a sleep instruction into one or more frames sent to the STA, thereby causing the STA to enter power save mode (622).

FIG. 6B is a flowchart illustrating a method 650 that is one embodiment of step 614 of FIG. 6A. In the method 650, to range the STA, the non-associated AP sends a probe frame to the STA during the STA's wake-up period (652). As described above, for some embodiments, the probe frame can be either a NULL frame or a QoS NULL frame; for other embodiments, the probe frame can be a RTS frame or any data frame that elicits a response from the STA. Further, if the STA responds only to frames sent from its associated AP, then the non-associated AP can spoof the MAC address of the associated AP and send a spoofed frame to the STA. After receiving the probe frame, the STA sends an acknowledgement (ACK) frame back to the non-associated AP (654). Then, the non-associated AP sends the ranging measurements to the WLAN server (656).

FIG. 6C is a flowchart illustrating a method 660 that is one embodiment of step 604 of FIG. 6A. In the method 660, to keep the STA awake for longer periods of time, the associated AP can assert the TIM bit in beacon frames sent to the STA (662). Assertion of the TIM bit indicates that the associated AP has additional data buffered for the STA. Thus, in response to receiving the asserted TIM in the beacon frame, the STA stays awake longer than its scheduled wake-up period to await transmission of additional data from the associated AP (664). This additional wake-up period, as depicted in FIG. 5B, allows the STA more time to receive and respond to probes sent from one or more non-associated APs.

FIG. 6D is a flowchart illustrating a method 670 that is another embodiment of step 604 of FIG. 6A. In the method 670, to keep the STA awake for longer periods of time, the associated AP can set the "more data" bit provided within any data frames sent to the STA (672). Thus, in response to receiving the asserted "more data" bit, the STA stays awake longer than its scheduled wake-up period to await transmission of additional data from the associated AP (674). This additional wake-up period, as depicted in FIG. 5B, allows the STA more time to receive and respond to probes sent from one or more non-associated APs.

As mentioned above, for some embodiments, the associated AP may keep the STA awake state for a prolonged period of time (e.g., indefinitely) by periodically sending "keep-awake" frames to the STA. Each keep-awake frame may keep the STA in the awake state for an additional time period. The additional time period may be defined by current and/or future protocols associated with the IEEE 802.11 family of standards, and/or may be dependent upon the particular make-and-model of the STA. For at least some embodiments, the keep-awake frames may be NULL frames having an asserted "more data" bit. For example, for an exemplary STA, reception of a NULL frame having an asserted "more data" bit may cause the STA to remain in the awake state for 2 ms. Thus, as long as each successive keep-awake frame is received by the exemplary STA within 2 ms after reception of the previous keep-awake frame, the STA may remain in the awake state for an indefinite period of time, which in turn may allow other devices (e.g., non-associated APs) sufficient time to perform ranging operations with the STA prior to the STA returning to the power save mode.

Figure 7:
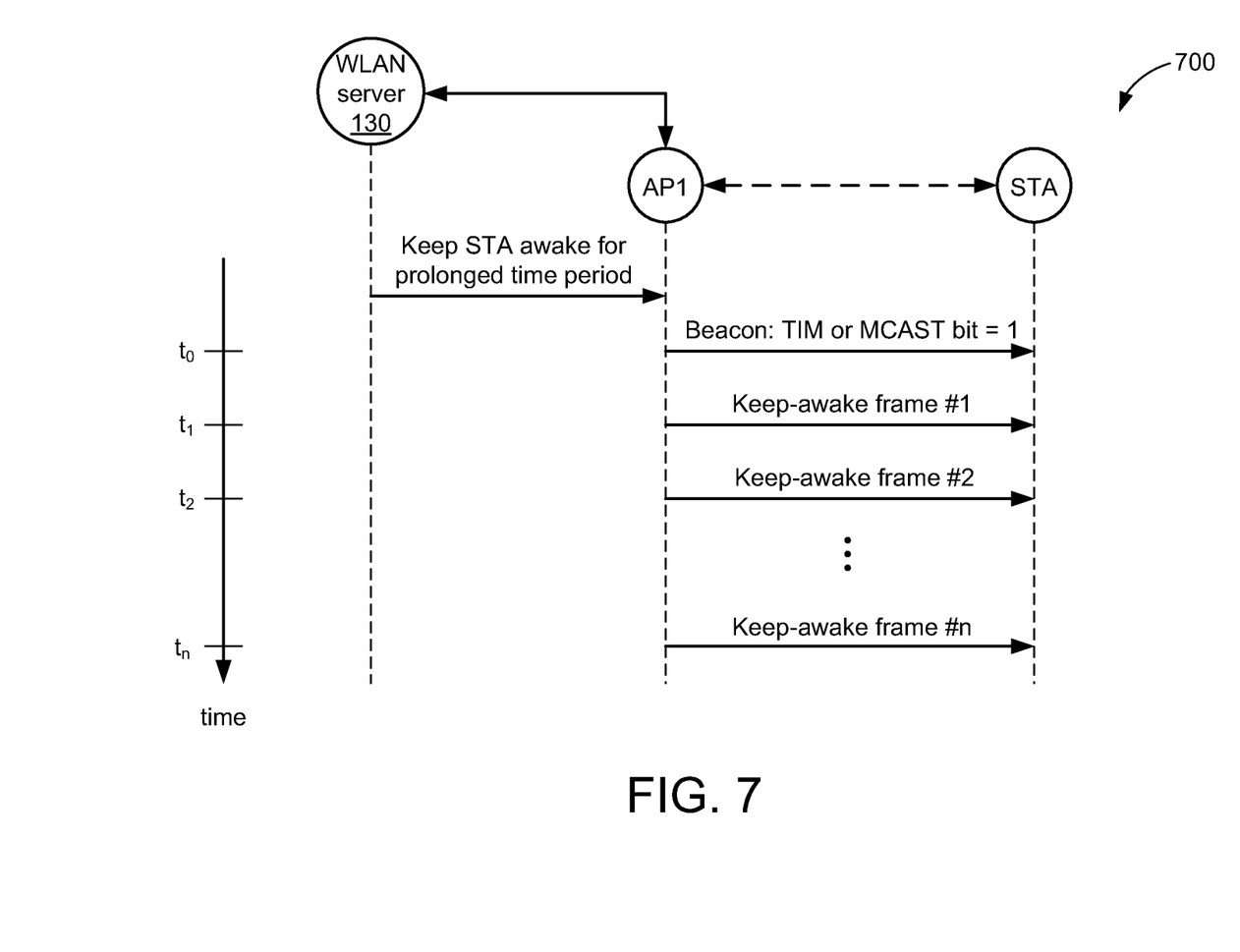
FIG. 7 is a timing diagram illustrating an exemplary operation for keeping a station in an awake state for an extended duration.

FIG. 7 depicts an exemplary operation for keeping a STA awake for an extended duration of time (e.g., for a time period greater than normally associated with a STA's wake-up period). Access point AP1, which is connected to WLAN server 130, is associated with the STA (e.g., such that AP1 has an established wireless connection with the STA). The WLAN server 130 may send AP1 an instruction to keep the STA awake for a prolonged period of time. For some embodiments, the WLAN server 130 may specify a number of keep-awake frames that the AP1 is to send to the STA.

In response to the instruction from the WLAN server 130, AP1 asserts the traffic indication message (TIM) bit provided within the next beacon frame, and then transmits the beacon frame to the STA (at time $t_0$). The beacon frame having an asserted TIM bit may be sent to the STA according to AP1's target beacon transmission times (TBTT). When the STA awakes from power save mode to listen for beacon frames broadcast from AP1, the STA receives the beacon frame including the asserted TIM bit (which may indicate that the associated AP has data buffered for the STA). In response thereto, the STA remains awake for an additional wake-up period. For other embodiments, the beacon frame sent to the STA may include an asserted DTIM bit (e.g., indicating broadcast data for the STA is queued by AP1) that may also cause the STA to remain awake for an additional wake-up period. In response thereto, the STA remains awake for an additional wake-up period (e.g., as described above with respect to FIG. 5B). For yet other embodiments, the beacon frame sent to the STA may include an asserted MCAST bit (e.g., indicating one or more multicast frames are queued by AP1) that may also cause the STA to remain awake for an additional wake-up period. In response thereto, the STA remains awake for an additional wake-up period (e.g., as described above with respect to FIG. 5B). Note that asserting the MCAST bit may, for some applications, result in the STA remaining awake (after receiving the beacon frame) for an additional wake-up period that is longer than the additional wake-up period associated with asserting the TIM bit in the beacon frame. In addition, asserting the MCAST bit may allow the STA to remain awake for the additional wake-up period in a manner that is independent of the STA's power save mechanisms. Thus, as used herein, a "traffic indication" bit may include the TIM bit, the DTIM bit, and/or the MCAST bit. For at least some embodiments, the AP may assert the TIM bit, the DTIM bit, and the MCAST bit (e.g., to logic one) in the beacon frame to prolong the duration of the additional wake-up period and/or to ensure that all STAs associated with the AP remain awake after receiving the beacon frame.

Prior to expiration of the additional wake-up period associated with the received beacon frame, AP1 sends a first keep-awake frame to the STA (at time $t_1$). Upon receiving the first keep-awake frame, the STA remains awake for an additional time period T. Then, prior to expiration of the additional time period T associated with the first keep-awake frame, AP1 sends a second keep-awake frame to the STA (at time $t_2$). Upon receiving the second keep-awake frame, the STA remains awake for another additional time period T. This process may be repeated until a last keep-awake frame is sent to the STA (at time $t_n$). After expiration of the additional time period T associated with the last keep-awake frame, the STA may return to power save mode.

Thus, by sending a number n=N of keep-awake frames to the STA, AP1 may keep the STA in the awake state for up to N additional time periods (in addition to the additional wake-up period associated with the beacon frame including an asserted TIM bit, an asserted DTIM bit, and/or an asserted MCAST bit). The STA may remain in the awake state as long as long as each keep-awake frame is received by the STA prior to expiration of the additional time period associated with a previous keep-awake frame.

These keep-awake frames may be sent to the STA within one of AP1's beacon intervals (e.g., between transmissions of beacon frames from AP1), thereby providing a mechanism to keep the STA awake for an extended duration of time without relying upon and/or waiting for a subsequent beacon transmission from AP1. Further, by using keep-awake frames periodically transmitted from AP1 to the STA (e.g., rather than relying upon a timer within the STA to keep the STA awake for longer durations), AP1 may keep the STA awake for an extended duration without any modifications to the STA. In this manner, the "STA-agnostic" techniques described herein may be used with numerous STAs already in use.

As mentioned above, each keep-awake frame may be a NULL frame having its more data (MD) bit asserted. The asserted MD bit within each NULL frame may keep the STA awake longer by indicating that the associated AP has more data queued for transmission to the STA. The STA, believing that the associated AP has more data to send, stays awake longer to receive the more data. For some embodiments, these NULL frames may be transmitted from a content after beacon queue (CABQ) associated with AP1 to ensure that the STA receives the first of these NULL frames during the additional wake-up period triggered by the asserted TIM bit (and/or the asserted DTIM bit and/or the asserted MCAST bit) in the beacon frame (see also FIG. 5B). For some embodiments, the CABQ may be located within memory 430 of FIG. 4.

For some embodiments, the WLAN server 130 may determine a desired time value for the extended duration (e.g., how long to keep the STA in the awake state), determine a minimum number of keep-awake frames to keep the STA awake for the desired time value, and then instruct AP1 to send the minimum number of keep-awake frames to the STA. For at least one embodiment, the WLAN server 130 may provide the desired time value to AP1, and AP1 may determine how many keep-awake frames to send to the STA.

For example, suppose the WLAN server 130 desires to keep the STA awake for a prolonged duration of 8 ms, the additional wake-up period associated with the beacon frame including an asserted TIM (and/or an asserted DTIM bit and/or an asserted MCAST bit) bit is 2 ms, and the additional time period T associated with each NULL frame including an asserted more data bit is 1.5 ms. For this example, AP1 may keep the STA awake for an extended duration of 8 ms by (1) sending a beacon frame including an asserted TIM bit (and/or an asserted DTIM bit and/or an asserted MCAST bit) to the STA and (2) sending a sequence of five NULL frames including an asserted more data bit to the STA, wherein pairs of successive NULL frames are sent to the STA within less than 1.5 ms of each other. Note that five such NULL frames may be sent (instead of four) because of the overlap between additional time periods associated with successively sent NULL frames. In other words, if AP1 sends a second NULL frame 1.5 ms after sending a first NULL frame, the STA may not receive the second NULL frame prior to expiration of the 1.5 ms time period associated with the first NULL frame. Thus, the time interval between transmission of successive NULL frames should be less than the additional time period that each NULL frames keeps the STA awake. Accordingly, for some embodiments, the keep-awake frames may be periodically transmitted from AP1 to the STA according to a schedule (e.g., stored within memory 240 of FIG. 2) to ensure that each keep-awake frame is received by the STA prior to expiration of the additional time period associated with a previous keep-awake frame.

FIG. 8 is an illustrative flow chart 800 depicting one embodiment of the operation described above with respect to FIG. 7. Referring also to FIGS. 1-4 and 7, WLAN server 130 (or AP1) may select a time value associated with a desired extended duration of time for which the STA is to be kept in the awake state (802). Then, WLAN server 130 (or AP1) may determine a minimum number of keep-awake frames to keep the STA awake for the selected time value (804). The minimum number of keep-awake frames may then be provided as a sequence of keep-awake frames to be sent to the STA (806). For embodiments in which WLAN server 130 selects the time value and the minimum number of keep-awake frames, WLAN server 130 may send to AP1 information indicating how many keep-awake frames are to be sent to the STA (808). For other embodiments, AP1 may perform some or all of the above steps (802, 804, and/or 806).

Then, during a next TBTT, AP1 asserts the TIM bit (and/or the DTIM bit and/or the MCAST bit) provided within a beacon frame, and then transmits the beacon frame to the STA (810). The STA awakes from power save mode to listen for beacon frames broadcast from AP1, receives the beacon frame including the asserted TIM bit, the asserted DTIM bit, and/or the asserted MCAST bit, and stays awake for an additional wake-up period associated with the asserted TIM bit, DTIM bit, and/or MCAST bit (812).

Then, prior to expiration of the additional wake-up period associated with the beacon frame, AP1 sends a sequence of N keep-awake frames to the STA (814). In response to receiving the N keep-awake frames transmitted from AP1, the STA stays awake for N additional time periods (each additional time period being triggered by a corresponding one of the keep-awake frames) (816). Then, after expiration of the extended duration, the STA may return to the power save mode (818).

As described above, for some embodiments, the keep-awake frames may be NULL frames including an asserted more data bit. For other embodiments, any frame indicating that additional data is available for transmission from AP1 to the STA may be used as keep-awake frames.

In the foregoing specification, the present embodiments have been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. For example, method steps depicted in the flow charts of FIGS. 6A-6D and 8 can be performed in other suitable orders and/or one or more methods steps may be omitted. In addition, although described above in the context of RTT ranging operations, the present embodiments are equally applicable to other types of ranging operations (e.g., RSSI and/or TDOA ranging techniques).

What is claimed is:

1. In a wireless network including an access point (AP) associated with a wireless station (STA), a method of keeping the STA in an awake state for an extended duration, the method comprising:
   receiving an instruction, from a server associated with the wireless network, to keep the STA awake for the extended duration;
   transmitting a beacon frame from the AP to the STA, wherein the beacon frame includes an asserted traffic indication bit to cause the STA to remain in the awake state for an additional wake-up period; and
   transmitting a sequence of keep-awake frames from the AP to the STA, wherein each keep-awake frame is to cause the STA to remain in the awake state for an additional time period.

2. The method of claim 1, wherein the keep-awake frames are periodically transmitted to the STA according to a schedule.

3. The method of claim 1, wherein each keep-awake frame comprises a NULL frame including an asserted more data bit.

4. The method of claim 1, wherein an interval between the transmission of successive keep-awake frames is less than the additional time period.

5. The method of claim 1, wherein the asserted traffic indication bit indicates that the AP has additional data queued for the STA.

6. The method of claim 1, wherein the traffic indication bit comprises a traffic indication message (TIM) bit, a delayed traffic indication message (DTIM) bit, and/or a multicast (MCAST) bit.

7. The method of claim 1, wherein at least one of the keep-awake frames is transmitted from a content after beacon queue (CABQ) associated with the AP.

8. The method of claim 1, further comprising, prior to transmitting the sequence of keep-awake frames:
   selecting a time value associated with the extended duration;
   determining a minimum number of the keep-awake frames to keep the STA awake for the selected time value; and
   providing the minimum number of the keep-awake frames into the sequence of keep-awake frames.

9. The method of claim 1, further comprising:
   receiving the sequence of keep-awake frames in the STA; and in response to each keep-awake frame, remaining in the awake state for the additional time period.

10. An access point (AP) associated with a station (STA) in a wireless network, the AP comprising:
  means for receiving an instruction to keep the STA awake for an extended duration;
  means for transmitting a beacon frame from the AP to the STA, wherein the beacon frame includes an asserted traffic indication bit to cause the STA to remain in the awake state for an additional wake-up period; and
  means for transmitting a sequence of keep-awake frames from the AP to the STA, wherein each keep-awake frame is to cause the STA to remain in the awake state for an additional time period.

11. The AP of claim 10, wherein the keep-awake frames are periodically transmitted to the STA according to a schedule.

12. The AP of claim 10, wherein each keep-awake frame comprises a NULL frame including an asserted more data bit.

13. The AP of claim 10, wherein an interval between the transmission of successive keep-awake frames is less than the additional time period.

14. The AP of claim 10, wherein the asserted traffic indication bit indicates that the AP has additional data queued for the STA.

15. The AP of claim 10, wherein the traffic indication bit comprises a traffic indication message (TIM) bit, a delayed traffic indication message (DTIM) bit, and/or a multicast (MCAST) bit.

16. The AP of claim 10, further comprising:
  means for transmitting at least one of the keep-awake frames from a content after beacon queue (CABQ) associated with the AP.

17. The AP of claim 10, further comprising:
  means for selecting a time value associated with the extended duration;
  means for determining a minimum number of the keep-awake frames to keep the STA awake for the selected time value; and
  means for providing the minimum number of the keep-awake frames into the sequence of keep-awake frames.

18. An access point (AP) associated with a station (STA) in a wireless network, the AP comprising:
  a transceiver to exchange data with the STA; and
  a processor, coupled to the transceiver, to:
    receive an instruction, from a server associated with the wireless network, to keep the STA awake for an extended duration;
    transmit a beacon frame from the AP to the STA, wherein the beacon frame includes an asserted traffic indication bit to cause the STA to remain in the awake state for an additional wake-up period; and
    transmit a sequence of keep-awake frames from the AP to the STA, wherein each keep-awake frame is to cause the STA to remain in the awake state for an additional time period.

19. The AP of claim 18, wherein the keep-awake frames are periodically transmitted to the STA according to a schedule.

20. The AP of claim 18, wherein each keep-awake frame comprises a NULL frame including an asserted more data bit.

21. The AP of claim 18, wherein an interval between the transmission of successive keep-awake frames is less than the additional time period.

22. The AP of claim 18, wherein the asserted traffic indication bit indicates that the AP has additional data queued for the STA.

23. The AP of claim 18, wherein the traffic indication bit comprises a traffic indication message (TIM) bit, a delayed traffic indication message (DTIM) bit, and/or a multicast (MCAST) bit.

24. The AP of claim 18, wherein at least one of the keep-awake frames is transmitted from a content after beacon queue (CABQ) associated with the AP.

25. The AP of claim 18, wherein the processor is to further:
  select a time value associated with the extended duration;
  determine a minimum number of the keep-awake frames to keep the STA awake for the selected time value; and
  provide the minimum number of the keep-awake frames into the sequence of keep-awake frames.

26. A non-transitory computer-readable storage medium containing program instructions that, when executed by a processor of a wireless access point (AP) associated with a station (STA) in a wireless network, causes the AP to:
  receive an instruction, from a server associated with the wireless network, to keep the STA awake for an extended duration;
  transmit a beacon frame from the AP to the STA, wherein the beacon frame includes an asserted traffic indication bit to cause the STA to remain in the awake state for an additional wake-up period; and
  transmit a sequence of keep-awake frames from the AP to the STA, wherein each keep-awake frame is to cause the STA to remain in the awake state for an additional time period.

27. A non-transitory computer-readable storage medium of claim 26, wherein the keep-awake frames are periodically transmitted to the STA according to a schedule.

28. A non-transitory computer-readable storage medium of claim 26, wherein each keep-awake frame comprises a NULL frame including an asserted more data bit.

29. A non-transitory computer-readable storage medium of claim 26, wherein an interval between the transmission of successive keep-awake frames is less than the additional time period.

30. A non-transitory computer-readable storage medium of claim 26, wherein the asserted traffic indication bit indicates that the AP has additional data queued for the STA.

31. A non-transitory computer-readable storage medium of claim 26, wherein the traffic indication bit comprises a traffic indication message (TIM) bit, a delayed traffic indication message (DTIM) bit, and/or a multicast (MCAST) bit.

32. A non-transitory computer-readable storage medium of claim 26, wherein at least one of the keep-awake frames is transmitted from a content after beacon queue (CABQ) associated with the AP.

33. A non-transitory computer-readable storage medium of claim 26, wherein the execution of the program instructions further causes the AP to:
  select a time value associated with the extended duration;
  determine a minimum number of the keep-awake frames to keep the STA awake for the selected time value; and
  provide the minimum number of the keep-awake frames into the sequence of keep-awake frames.

* * * * *